US012512046B1

(12) United States Patent
Wu et al.

(10) Patent No.: US 12,512,046 B1
(45) Date of Patent: Dec. 30, 2025

(54) DISPLAY PANEL AND A DRIVING CIRCUIT ADAPTABLE THERETO

(71) Applicant: Prilit Optronics, Inc., Tainan (TW)

(72) Inventors: Biing-Seng Wu, Tainan (TW); Chia-Hsuan Huang, Tainan (TW)

(73) Assignee: Prilit Optronics, Inc., Tainan (TW)

( * ) Notice: Subject to any disclaimer, the term of this patent is extended or adjusted under 35 U.S.C. 154(b) by 0 days.

(21) Appl. No.: 18/933,865

(22) Filed: Oct. 31, 2024

(51) Int. Cl.
*G09G 3/32* (2016.01)
*G09G 3/3233* (2016.01)

(52) U.S. Cl.
CPC ............. *G09G 3/32* (2013.01); *G09G 3/3233* (2013.01); *G09G 2300/0852* (2013.01); *G09G 2310/061* (2013.01); *G09G 2340/0435* (2013.01)

(58) Field of Classification Search
CPC ................... G09G 3/32; G09G 3/3233; G09G 2300/0852; G09G 2310/061; G09G 2340/0435
USPC ............................................................ 345/55
See application file for complete search history.

(56) References Cited

U.S. PATENT DOCUMENTS

| | | | | |
|---|---|---|---|---|
| 10,964,265 | B2 * | 3/2021 | Xu | G09G 3/3233 |
| 11,011,113 | B1 * | 5/2021 | Lu | G09G 3/3225 |
| 11,620,942 | B2 * | 4/2023 | Yang | G09G 3/3233 345/212 |
| 2014/0118229 | A1 * | 5/2014 | Han | G09G 3/3233 345/82 |
| 2014/0347405 | A1 * | 11/2014 | Kumeta | G09G 3/3233 345/82 |
| 2016/0232840 | A1 * | 8/2016 | Tseng | G09G 3/3233 |
| 2019/0287452 | A1 * | 9/2019 | Wang | G09G 3/325 |
| 2021/0335261 | A1 * | 10/2021 | Yang | G09G 3/3233 |
| 2022/0114972 | A1 * | 4/2022 | Zhang | G09G 3/3266 |
| 2022/0238069 | A1 * | 7/2022 | Huang | G09G 3/32 |
| 2023/0090375 | A1 * | 3/2023 | Xue | G09G 3/3233 345/690 |
| 2024/0312404 | A1 * | 9/2024 | Zhang | G09G 3/3233 |

* cited by examiner

*Primary Examiner* — Tom V Sheng
(74) *Attorney, Agent, or Firm* — Donald E. Stout; Stout, Uxa & Buyan, LLP

(57) ABSTRACT

A driving circuit adaptable to a display panel includes a driving transistor connected between a first supply voltage and a light-emitting diode (LED); and two capacitors controllably connected to the driving transistor and a corresponding data line that provides an image signal. One of the two capacitors is used as a driving capacitor to controllably drive the driving transistor with a present image signal, while another of the two capacitors is used as a pre-loading capacitor for controllably pre-loading a succeeding image signal therein.

20 Claims, 3 Drawing Sheets

DISPLAY PANEL AND A DRIVING CIRCUIT ADAPTABLE THERETO

BACKGROUND OF THE INVENTION

1. Field of the Invention

The present invention generally relates to a display panel, and more particularly to a driving circuit adaptable to a light-emitting diode (LED) display panel.

2. Description of Related Art

A light-emitting diode (LED) display panel is a flat panel display that uses an array of LEDs to produce images and videos. Each pixel in an LED display panel is made up of small LEDs that emit light when an electric current passes through them. Unlike liquid crystal display (LCD), the LED display panel is self-emissive, and each LED in the LED display panel emits its own light, providing better contrast and brightness.

Active-matrix organic LED (AMOLED) is commonly adopted in the LED display panel. It is a type of organic LED (OLED) display technology that uses an active matrix of thin-film transistors (TFTs) to control the pixels. This allows for faster response times and more precise control over the display. AMOLED display panels use organic compounds that emit light when an electric current passes through them.

MicroLED (also known as mLED or μLED) is also commonly adopted in the LED display panel that uses microscopic LEDs to create individual pixels. MicroLEDs are extremely small, typically less than 100 micrometers in size. Therefore, microLED display panels can achieve very high pixel densities, making them suitable for high-resolution applications.

A hold-type display is a type of display technology where each frame is held on the screen until the next frame is displayed. This is in contrast to impulse-type displays, where each frame is shown for a brief moment and then the screen goes dark until the next frame. Hold-type display is common in modern displays like LED displays. While this method is effective for many applications, it can introduce motion blur, especially during fast-moving scenes. Motion blur occurs because our eyes naturally follow moving objects, but the hold-type display keeps the image static until the next frame, causing a smearing effect.

In more details, the pixels are driven row by row for a scanning selection period and are kept displayed during a single frame period after the termination of the line selection period. That is, for every pixel, the pixel intensity remains a constant value until being updated in the next image frame. When displaying multiple consecutive image frames, a moving object in a video remains static in one image frame, resulting in motion blur effect for human vision. As a method for reducing the motion image blur, there has been known a technique of inserting a black image into between the two frames.

Hold-type displays, such as those used in LED display panels, indeed face challenges like frame rate limitations, primarily due to the method of inserting black/monochrome images or smooth frames to improve motion image quality. A need has thus arisen to propose a novel scheme to improve frame rate, crosstalk issue and motion blur for the LED display panels.

SUMMARY OF THE INVENTION

In view of the foregoing, it is an object of the embodiment of the present invention to provide a driving circuit adaptable to a light-emitting diode (LED) display panel with improved frame rate, mitigated crosstalk issue and reduced motion blur.

According to one embodiment, a driving circuit adaptable to a display panel includes a driving transistor and two capacitors. The driving transistor is connected between a first supply voltage and a light-emitting diode (LED). The two capacitors are controllably connected to the driving transistor and a corresponding data line that provides an image signal. One of the two capacitors is used as a driving capacitor to controllably drive the driving transistor with a present image signal, while another of the two capacitors is used as a pre-loading capacitor for controllably pre-loading a succeeding image signal therein.

DETAILED DESCRIPTION OF THE INVENTION

Figure 1:
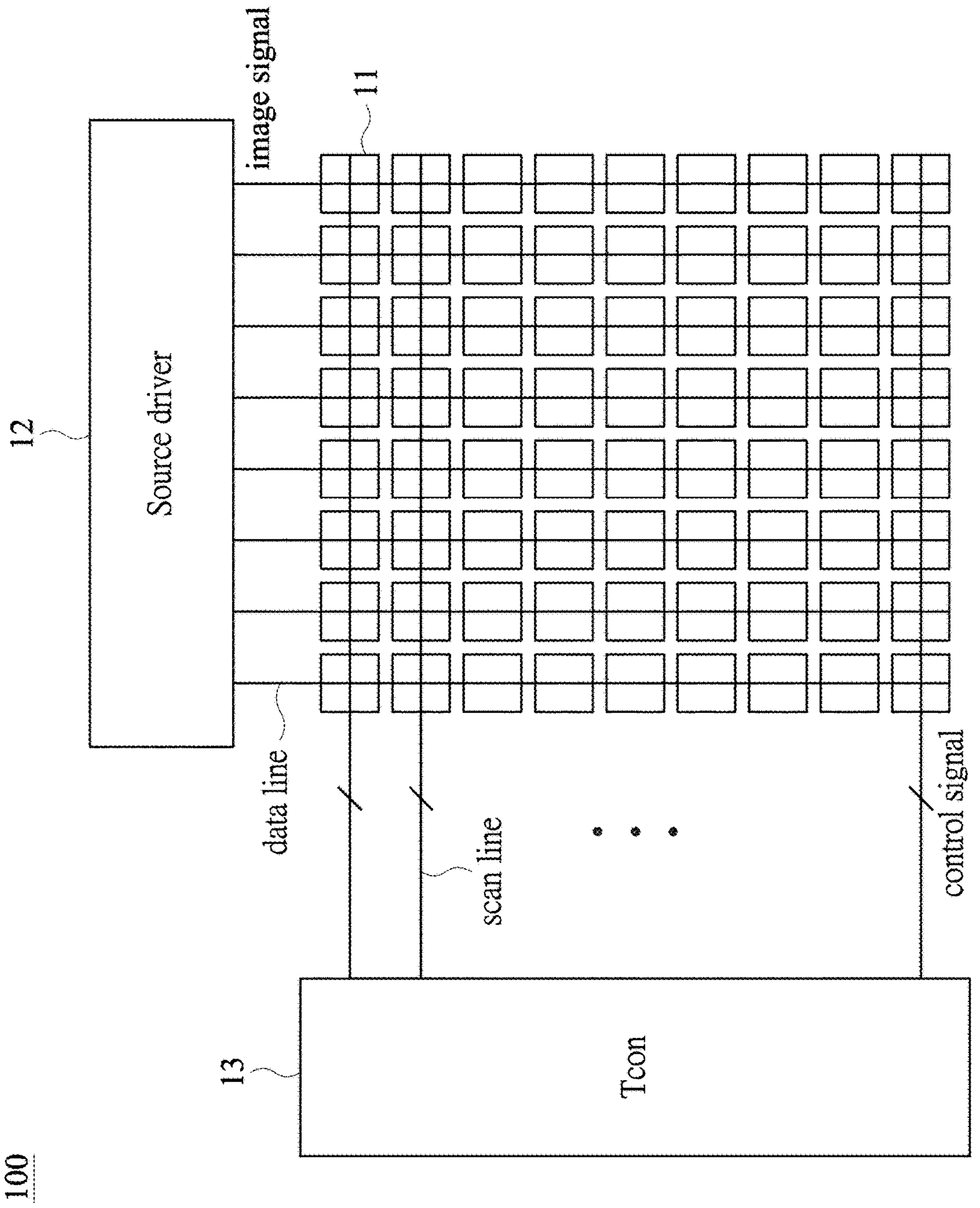
FIG. 1 shows a block diagram illustrating a display panel according to one embodiment of the present invention.

FIG. 1 shows a block diagram illustrating a display panel 100 according to one embodiment of the present invention. The display panel 100 of the embodiment is preferably an active-matrix display panel, where each frame of image is globally displayed/refreshed, that is, entire frame of image is displayed at the same time and in the same period.

Specifically, the display panel 100 of the embodiment may include a plurality of pixel cells 11 that are configured to display an image and are ordinarily arranged in row and column. The display panel 100 may include a source driver 12 configured to provide image signals to the pixel cells 11 via data lines, where the image signals represent the image to be displayed on the pixel cells 11. As shown in FIG. 1, each column of pixel cells 11 is coupled to receive an image signal via a corresponding data line. The display panel 100 may include a timing controller (Tcon) 13 configured to sequentially control rows of pixel cells 11 by control signals via scan lines. As shown in FIG. 1, each row of pixel cells 11 is coupled to receive (at least two) control signals via corresponding scan lines.

Figure 2:
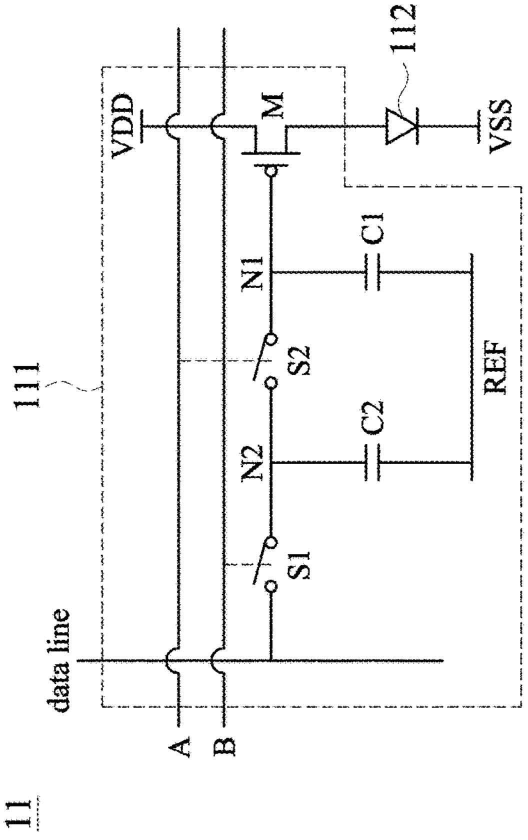
FIG. 2 shows a circuit diagram illustrating a pixel cell of FIG. 1 according to one embodiment of the present invention.

FIG. 2 shows a circuit diagram illustrating a pixel cell 11 of FIG. 1 according to one embodiment of the present invention. Specifically, the pixel cell 11 may include a driving circuit 111 adaptable to driving a light-emitting diode (LED) 112 of the pixel cell 11 in the display panel 100. The LED 112 of the embodiment is preferably an active-matrix organic LED (AMOLED) or a microLED (also known as mLED or μLED). In the embodiment, the driving circuit 111 and the LED 112 of each pixel cell 11 are disposed on the same layer.

Specifically, the driving circuit 111 may include a driving transistor M, such as metal-oxide-semiconductor field-effect transistor or MOSFET, connected between a first supply voltage (e.g., VDD) and the LED 112. In the embodiment, the driving transistor M is a P-type transistor with a source connected to the first supply voltage (e.g., VDD), and a drain connected to an anode of the LED 112 having a cathode connected to a second supply voltage (e.g., VSS or common-mode voltage Vcm) that has a voltage potential lower than the first supply voltage.

According to one aspect of the embodiment, the driving circuit 111 may include (at least) two capacitors, for example, a first capacitor C1 and a second capacitor C2, controllably connected to (a gate of) the driving transistor M and the corresponding data line. In a display phase during which an image is displayed on the pixel cells 11, one of the two capacitors is used as a driving capacitor (say the first capacitor C1) to controllably drive the driving transistor M with a present image signal V_t (under control of the control signals via the scan lines), while another of the two capacitors is used as a pre-loading capacitor (say the second capacitor C2) for controllably pre-loading a succeeding image signal V_t+1 therein (under control of the control signals via the scan lines). It is noted that image signals are pre-loaded into the pixel cells 11 row by row under limited data lines, while each frame of image is globally displayed.

In the embodiment as shown in FIG. 2, the driving circuit 111 may include a first capacitor C1 with a first end connected to a first node N1 that is connected to (the gate of) the driving transistor M and a second end connected to a (fixed) reference point REF (which may refer to zero potential, VSS or VDD); and a second capacitor C2 with a first end connected to a second node N2 that is connected to a corresponding data line via a first switch S1 and a second end connected to the reference point REF. A second switch S2 is connected between the first node N1 and the second node N2. The second switch S2 and the first switch S1 are controlled by a first control signal A and a second control signal B respectively. In the embodiment, the second capacitor C2 has a capacitance substantially greater than (e.g., 100 times) a capacitance of the first capacitor C1.

Figure 3B:
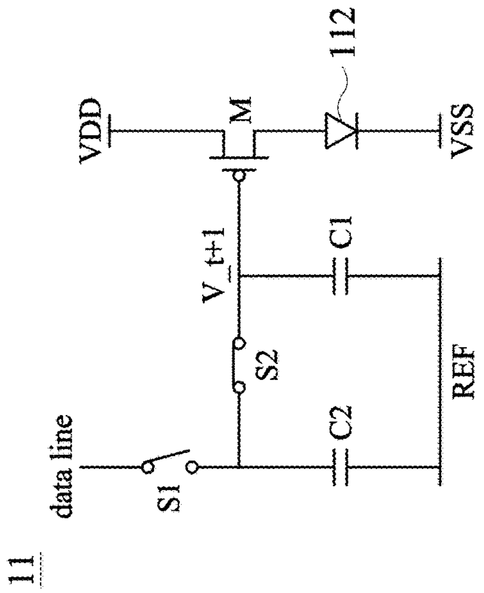
FIG. 3A and FIG. 3B show equivalent simplified circuits illustrating operations of the driving circuit of FIG. 2.
Figure 3A:
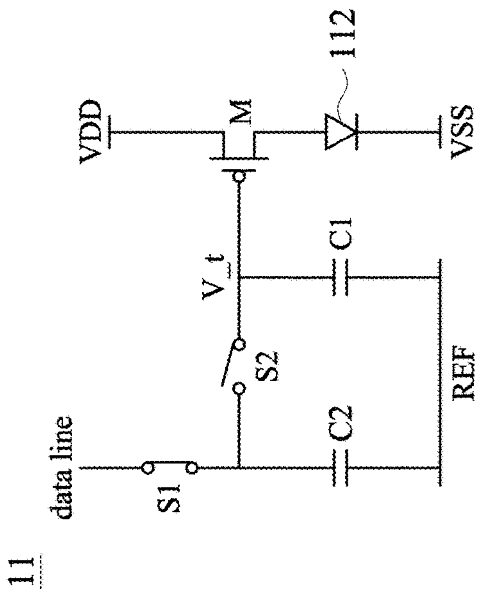

FIG. 3A and FIG. 3B show equivalent simplified circuits illustrating operations of the driving circuit 111 of FIG. 2. In a display phase as shown in FIG. 3A, the first switch S1 is turned on and the second switch S2 is turned off. Accordingly, the first capacitor C1 is used as the driving capacitor to controllably drive the driving transistor M with a present image signal V_t, and the second capacitor C2 is used as the pre-loading capacitor for controllably pre-loading a succeeding image signal V_t+1 therein. Next, in a vertical blanking interval as a transfer (or update/refresh) phase as shown in FIG. 3B, the first switch S1 is turned off and the second switch S2 is turned on. Accordingly, pre-loaded succeeding image signal V_t+1 in the second capacitor C2 is controllably transferred to the first capacitor C1. The display phase of FIG. 3A and the transfer phase of FIG. 3B are executed repeatedly to controllably drive the driving transistor M with a present image signal and pre-load a succeeding image signal (FIG. 3A), followed by transferring the pre-loaded succeeding image signal to the first capacitor C1 (FIG. 3B).

Figure 4:
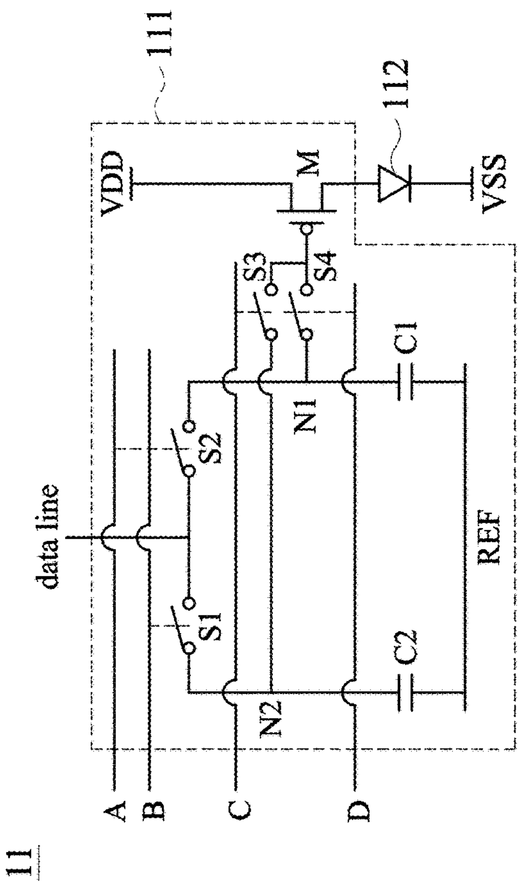
FIG. 4 shows a circuit diagram illustrating a pixel cell of FIG. 1 according to another embodiment of the present invention.

FIG. 4 shows a circuit diagram illustrating a pixel cell 11 of FIG. 1 according to another embodiment of the present invention. The pixel cell 11 of FIG. 4 is similar to the pixel cell 11 of FIG. 2 with the exceptions as described below.

In the embodiment as shown in FIG. 4, the driving circuit 111 may include a first capacitor C1 with a first end connected to a first node N1 and a second end connected to a reference point REF; and a second capacitor C2 with a first end connected to a second node N2 and a second end connected to the reference point REF. The second node N2 is connected to a corresponding data line via a first switch S1, the first node N1 is connected to the corresponding data line via a second switch S2, the second node N2 is also connected to (a gate of) the driving transistor M via a third switch S3, and the first node N1 is also connected to (the gate of) the driving transistor M via a fourth switch S4. The second switch S2, the first switch S1, the third switch S3 and the fourth switch S4 are controlled by a first control signal A, a second control signal B, a third control signal C and a fourth control signal D respectively. In the embodiment, a capacitance of the second capacitor C2 does not need to be greater than a capacitance of the first capacitor C1.

Figure 5B:
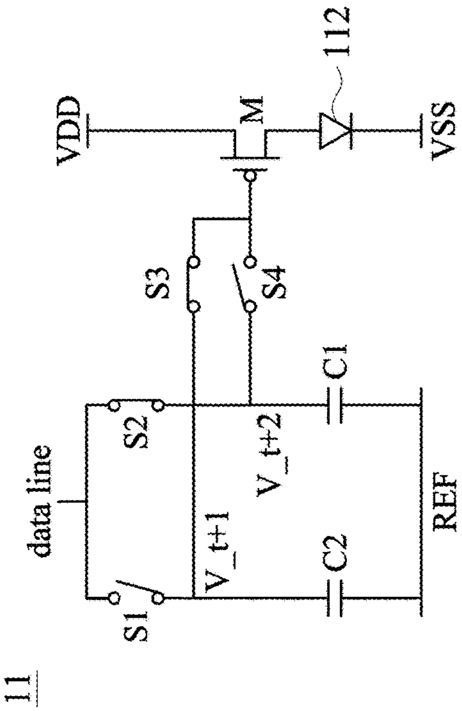
FIG. 5A and FIG. 5B show equivalent simplified circuits illustrating operations of the driving circuit of FIG. 4.
Figure 5A:
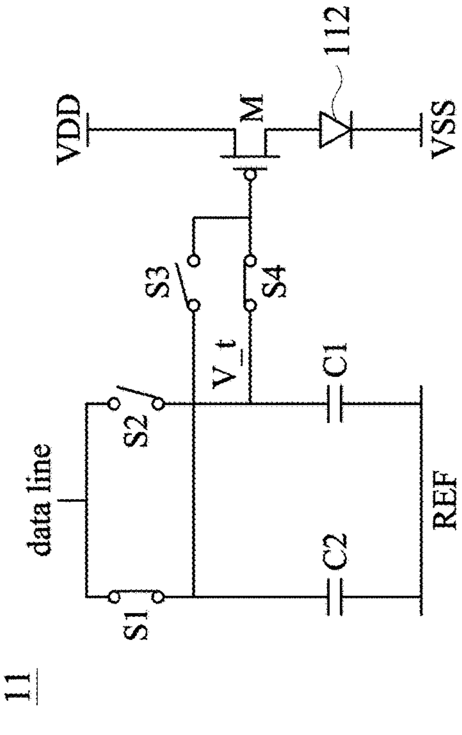

FIG. 5A and FIG. 5B show equivalent simplified circuits illustrating operations of the driving circuit 111 of FIG. 4. In a first display phase (starting at time t) as shown in FIG. 5A, the first switch S1 and the fourth switch S4 are turned on, and the second switch S2 and the third switch S3 are turned off. Accordingly, the first capacitor C1 is used as the driving capacitor to controllably drive the driving transistor M with a present image signal V_t, and the second capacitor C2 is used as the pre-loading capacitor for controllably pre-loading a succeeding image signal V_t+1 therein. Subsequently, in a second display phase (starting at time t+1) as shown in FIG. 5B, the first switch S1 and the fourth switch S4 are turned off, and the second switch S2 and the third switch S3 are turned on. Accordingly, the second capacitor C2 is used as the driving capacitor to controllably drive the driving transistor M with a present image signal V_t+1, and the first capacitor C1 is used as the pre-loading capacitor for controllably pre-loading a succeeding image signal V_t+2 therein. The display phase of FIG. 5A and the display phase of FIG. 5B are executed repeatedly to controllably drive the driving transistor M with a present image signal and pre-load a succeeding image signal in each display phase. As the first capacitor C1 and the second capacitor C2 alternately serve as the driving capacitor in consecutive display phases (while the other capacitor serves as the pre-loading capacitor), a transfer phase of FIG. 3B is thus not required in the embodiment of FIG. 4. It is noted that image signals are pre-loaded into the pixel cells 11 row by row under limited data lines, while each frame of image is globally displayed/refreshed. The mentioned embodiments with the pre-loading capacitor can display the image in global manner, therefore frame rate, motion blur and smearing effect are improved. The global display manner of the embodiments is also suitable for stereoscopic displays with high frame rate, no crosstalk.

Although specific embodiments have been illustrated and described, it will be appreciated by those skilled in the art that various modifications may be made without departing from the scope of the present invention, which is intended to be limited solely by the appended claims.

What is claimed is:

1. A driving circuit adaptable to a display panel, the driving circuit comprising:

a driving transistor connected between a first supply voltage and a light-emitting diode (LED); and two capacitors controllably connected to the driving transistor and a corresponding data line that provides an image signal;

wherein one of the two capacitors is used as a driving capacitor to controllably drive the driving transistor with a present image signal, while another of the two capacitors is used as a pre-loading capacitor for controllably pre-loading a succeeding image signal therein;

wherein first ends of the two capacitors are controllably connected to the driving transistor and a corresponding data line, and second ends of the two capacitors are connected to a fixed reference point.

2. The driving circuit of claim 1, wherein the two capacitors comprise a first capacitor and a second capacitor, wherein the first capacitor is used as the driving capacitor to controllably drive the driving transistor with a present image signal and the second capacitor is used as the pre-loading capacitor for controllably pre-loading a succeeding image signal therein in a display phase, and the succeeding image signal pre-loaded in the second capacitor is controllably transferred to the first capacitor in a vertical blanking interval.

3. The driving circuit of claim 2, wherein the second capacitor has a capacitance substantially greater than a capacitance of the first capacitor.

4. The driving circuit of claim 2, wherein the first capacitor has a first end connected to a first node that is connected to a gate of the driving transistor and has a second end connected to a reference point; the second capacitor has a first end connected to a second node that is connected to the corresponding data line via a first switch and has a second end connected to the reference point; and a second switch is connected between the first node and the second node.

5. The driving circuit of claim 4, wherein the first switch is turned on and the second switch is turned off in the display phase, and the first switch is turned off and the second switch is turned on in the vertical blanking interval.

6. The driving circuit of claim 1, wherein the two capacitors comprise a first capacitor and a second capacitor, which alternately serve as the driving capacitor in consecutive display phases.

7. The driving circuit of claim 6, wherein the first capacitor has a first end connected to a first node and has a second end connected to a reference point; and the second capacitor has a first end connected to a second node and has a second end connected to the reference point; wherein the second node is connected to the corresponding data line via a first switch, the first node is connected to the corresponding data line via a second switch, the second node is also connected to a gate of the driving transistor via a third switch, and the first node is also connected to the gate of the driving transistor via a fourth switch.

8. The driving circuit of claim 7, wherein the first switch and the fourth switch are turned on and the second switch and the third switch are turned off in a first display phase in which the first capacitor is used as the driving capacitor and the second capacitor is used as the pre-loading capacitor; and the first switch and the fourth switch are turned off and the second switch and the third switch are turned on in a consecutive second display phase in which the second capacitor is used as the driving capacitor and the first capacitor is used as the pre-loading capacitor.

9. The driving circuit of claim 1, wherein the driving transistor is a P-type transistor with a source connected to the first supply voltage, and a drain connected to an anode of the LED having a cathode connected to a second supply voltage that has a voltage potential lower than the first supply voltage.

10. A display panel, comprising:
- a plurality of pixel cells that display an image;
- a source driver that provides image signals to the plurality of pixel cells via data lines; and
- a timing controller that sequentially controls rows of the plurality of pixel cells by control signals via scan lines;
- wherein each pixel cell of the plurality of pixel cells comprises:
- a light-emitting diode (LED); and
- a driving circuit comprising:
  - a driving transistor connected between a first supply voltage and the LED; and
  - two capacitors controllably connected to the driving transistor and a corresponding data line that provides an image signal;
- wherein one of the two capacitors is used as a driving capacitor to controllably drive the driving transistor with a present image signal, while another of the two capacitors is used as a pre-loading capacitor for controllably pre-loading a succeeding image signal therein;
- wherein first ends of the two capacitors are controllably connected to the driving transistor and a corresponding data line, and second ends of the two capacitors are connected to a fixed reference point.

11. The display panel of claim 10, wherein the two capacitors comprise a first capacitor and a second capacitor, wherein the first capacitor is used as the driving capacitor to controllably drive the driving transistor with a present image signal and the second capacitor is used as the pre-loading capacitor for controllably pre-loading a succeeding image signal therein in a display phase, and the succeeding image signal pre-loaded in the second capacitor is controllably transferred to the first capacitor in a vertical blanking interval.

12. The display panel of claim 11, wherein the second capacitor has a capacitance substantially greater than a capacitance of the first capacitor.

13. The display panel of claim 11, wherein the first capacitor has a first end connected to a first node that is connected to a gate of the driving transistor and has a second end connected to a reference point; the second capacitor has a first end connected to a second node that is connected to the corresponding data line via a first switch and has a second end connected to the reference point; and a second switch is connected between the first node and the second node.

14. The display panel of claim 13, wherein the first switch is turned on and the second switch is turned off in the display phase, and the first switch is turned off and the second switch is turned on in the vertical blanking interval.

15. The display panel of claim 10, wherein the two capacitors comprise a first capacitor and a second capacitor, which alternately serve as the driving capacitor in consecutive display phases.

16. The display panel of claim 15, wherein the first capacitor has a first end connected to a first node and has a second end connected to a reference point; and the second capacitor has a first end connected to a second node and has a second end connected to the reference point; wherein the second node is connected to the corresponding data line via a first switch, the first node is connected to the corresponding data line via a second switch, the second node is also connected to a gate of the driving transistor via a third switch, and the first node is also connected to the gate of the driving transistor via a fourth switch.

17. The display panel of claim 16, wherein the first switch and the fourth switch are turned on and the second switch and the third switch are turned off in a first display phase in which the first capacitor is used as the driving capacitor and the second capacitor is used as the pre-loading capacitor; and the first switch and the fourth switch are turned off and the second switch and the third switch are turned on in a consecutive second display phase in which the second capacitor is used as the driving capacitor and the first capacitor is used as the pre-loading capacitor.

18. The display panel of claim 10, wherein the LED comprises an active-matrix organic LED (AMOLED) or a microLED.

19. The display panel of claim 10, wherein the display panel is an active-matrix display panel, where each frame of image is globally displayed.

20. The display panel of claim 10, wherein the driving transistor is a P-type transistor with a source connected to the first supply voltage, and a drain connected to an anode of the LED having a cathode connected to a second supply voltage that has a voltage potential lower than the first supply voltage.

* * * * *